(12) United States Patent
Zhu

(10) Patent No.: US 12,532,635 B2
(45) Date of Patent: Jan. 20, 2026

(54) UNDER-SCREEN CAMERA ASSEMBLY, BACKLIGHT MODULE AND DISPLAY APPARATUS

(71) Applicant: Huizhou TCL Cloud Internet Corporation Technology Co., Ltd., Guangdong (CN)

(72) Inventor: Jianfeng Zhu, Guangdong (CN)

(73) Assignee: Huizhou TCL Cloud Internet Corporation Tech, Guangdong (CN)

( * ) Notice: Subject to any disclaimer, the term of this patent is extended or adjusted under 35 U.S.C. 154(b) by 37 days.

(21) Appl. No.: 18/682,432

(22) PCT Filed: Sep. 30, 2021

(86) PCT No.: PCT/CN2021/122329
§ 371 (c)(1),
(2) Date: Feb. 8, 2024

(87) PCT Pub. No.: WO2023/015698
PCT Pub. Date: Feb. 16, 2023

(65) Prior Publication Data
US 2024/0357899 A1 Oct. 24, 2024

(30) Foreign Application Priority Data
Aug. 12, 2021 (CN) .......................... 202110923612.8

(51) Int. Cl.
*H10K 59/50* (2023.01)
*G02F 1/29* (2006.01)
(Continued)

(52) U.S. Cl.
CPC ............... *H10K 59/50* (2023.02); *G02F 1/29* (2013.01); *H04N 23/50* (2023.01);
(Continued)

(58) Field of Classification Search
CPC .... H10K 59/50; H10K 59/8791; H10K 59/90; H10K 59/65; G02F 1/29; G02F 1/133528;
(Continued)

(56) References Cited

U.S. PATENT DOCUMENTS

| | | | |
|---|---|---|---|
| 2017/0219859 A1* | 8/2017 | Christophy | G02F 1/29 |
| 2021/0233977 A1* | 7/2021 | Yang | H04M 1/0266 |
| 2022/0187655 A1* | 6/2022 | Park | G02F 1/133514 |

FOREIGN PATENT DOCUMENTS

| | | |
|---|---|---|
| CN | 109856850 A | 6/2019 |
| CN | 110010666 A | 7/2019 |

(Continued)

OTHER PUBLICATIONS

International Search Report in International application No. PCT/CN2021/122329, mailed on Dec. 27, 2023.
(Continued)

*Primary Examiner* — Abdelaaziz Tissire
(74) *Attorney, Agent, or Firm* — PV IP PC; Wei Te Chung

(57) ABSTRACT

An under-screen camera assembly, a backlight module and a display apparatus. The under-screen camera assembly includes: an Organic Light Emitting Diode (OLED) screen, where the OLED screen is provided with an OLED high transmittance region; a first polarizer and a second polarizer both disposed on the OLED high transmittance region, where the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect.

10 Claims, 2 Drawing Sheets

(51) Int. Cl.
  *H04M 1/02* (2006.01)
  *H04N 23/50* (2023.01)
  *H10K 59/80* (2023.01)
  *H10K 59/90* (2023.01)

(52) U.S. Cl.
  CPC ......... *H10K 59/8791* (2023.02); *H10K 59/90* (2023.02); *H04M 1/0264* (2013.01); *H04M 1/0266* (2013.01)

(58) Field of Classification Search
  CPC ..... H04N 23/50; H04N 23/55; H04M 1/0264; H04M 1/0266; Y02B 20/30; G02B 5/3033; G09G 3/3208; G09G 3/36
  See application file for complete search history.

(56) References Cited

FOREIGN PATENT DOCUMENTS

| CN | 110602407 | A | | 12/2019 | |
|----|-----------|---|---|---------|---|
| CN | 110824788 | A | | 2/2020 | |
| CN | 210155484 | U | | 3/2020 | |
| CN | 111308771 | A | | 6/2020 | |
| CN | 111443518 | A | | 7/2020 | |
| CN | 110010666 | B | * | 3/2021 | ............. H04N 23/57 |
| CN | 113189805 | A | | 7/2021 | |
| CN | 213659142 | U | | 7/2021 | |
| JP | 2008197125 | A | | 8/2008 | |
| WO | 2020215879 | A1 | | 10/2020 | |

OTHER PUBLICATIONS

Written Opinion of the International Search Authority in International application No. PCT/CN2021/122329, mailed on Dec. 27, 2023.

Chinese Office Action issued in corresponding Chinese Patent Application No. 202110923612.8 dated Mar. 23, 2022, pp. 1-6.

* cited by examiner

A single circular aperture      B multiple circular apertures

Position of missing order

UNDER-SCREEN CAMERA ASSEMBLY, BACKLIGHT MODULE AND DISPLAY APPARATUS

CROSS-REFERENCE TO RELATED APPLICATION

This application is a US national phase application based upon an International Application No. PCT/CN2021/122329, filed on Sep. 30, 2021, which claims priority to Chinese Patent Application No. 202110923612.8, entitled "UNDER-SCREEN CAMERA ASSEMBLY, BACKLIGHT MODULE AND DISPLAY APPARATUS", filed on Aug. 12, 2021, the disclosure of which is incorporated herein by reference in its entirety.

TECHNICAL FIELD

The present disclosure relates to the field of display technologies, and more particularly to an under-screen camera assembly, a backlight module, and a display device.

BACKGROUND

Mobile terminals, such as mobile phones, may employ a full-screen design today. In order to pursue a true full screen, it has become unstoppable to eliminate a hole for a front-facing camera on the screen. Therefore, the camera may be disposed under the screen. However, stacking of various layers of materials of the screen form refraction of the screen in the various layers and opacity of RGB (red, green, and blue) light-emitting points displayed on the screen, forming diffraction of a hole region or a barrier. In particular, in the case where a light source is relatively strong or a portion of the light source is relatively large, a picture taken may be obscured by diffraction, so that more valid display regions are covered by the diffracted light source, and a specimen taken is seriously distorted.

Therefore, an improvement and a development of the related art may be required.

SUMMARY

Technical problems to be solved by the present disclosure are to provide an under-screen camera assembly, a backlight module, and a display device for above-mentioned drawbacks of the related art. The present disclosure aims to solve the technical problems in the related art that diffraction of the hole region or the barrier causes the valid display region to be covered by the diffracted light source, and the specimen to be seriously distorted.

In order to solve the above technical problems, the technical solutions adopted in the present disclosure are as follows.

In a first aspect, the present disclosure provides an under-screen camera assembly, including: an Organic Light Emitting Diode (OLED) screen on which an OLED high transmittance region is disposed; a first polarizer and a second polarizer both disposed on the OLED high transmittance region, where the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect; and
the liquid crystals include a plurality of liquid crystals, and each of the liquid crystals is connected to the TFT driving circuit and has a different deflection angle has a different deflection angle from that of another one of the liquid crystals.

In one implementation, the under-screen camera assembly further includes a camera disposed on one side of the TFT driving circuit and opposite to the liquid crystals.

In one implementation, the camera includes: a camera body; a camera convex lens disposed inside the camera body; and an imaging sensor disposed outside the camera body; where the camera convex lens is disposed opposite to the liquid crystals.

In one implementation, a line on the liquid crystals for driving RGB light-emitting points to light is a transparent Indium Tin Oxide (ITO) material.

In one implementation, an area of the OLED high transmittance region is less than that of the first polarizer.

In one implementation, the first polarizer, the second polarizer, and the liquid crystals have the same area.

In one implementation, the first polarizer and the second polarizer have the same shape.

In one implementation, the OLED high transmittance region is disposed under the OLED screen, and when a mobile phone is configured to photograph, light rays emitted by a far-field light source enter the inside of the under-screen camera assembly through the OLED high transmittance region to perform imaging on the camera.

In a second aspect, the present disclosure provides an under-screen camera assembly, including: an Organic Light Emitting Diode (OLED) screen on which an OLED high transmittance region is disposed; a first polarizer and a second polarizer both disposed on the OLED high transmittance region, where the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect.

In one implementation, the liquid crystals include a plurality of liquid crystals and each of the liquid crystals is connected to the TFT driving circuit.

In one implementation, each of the liquid crystals has a different deflection angle from that of another one of the liquid crystals.

In one implementation, the under-screen camera assembly further includes a camera disposed on one side of the TFT driving circuit and opposite to the liquid crystals.

In one implementation, the camera includes: a camera body; a camera convex lens disposed inside the camera body; and an imaging sensor disposed outside the camera body; where the camera convex lens is disposed opposite to the liquid crystals.

In one implementation, a line on the liquid crystals for driving RGB light-emitting points to light is a transparent Indium Tin Oxide (ITO) material.

In one implementation, an area of the OLED high transmittance region is less than that of the first polarizer.

In one implementation, the first polarizer, the second polarizer, and the liquid crystals have the same area.

In one implementation, the first polarizer and the second polarizer have the same shape.

In one implementation, the OLED high transmittance region is disposed under the OLED screen, and when a picture is taken by a mobile phone, light rays emitted by a far-field light source enter the inside of the under-screen camera assembly through the OLED high transmittance region to perform imaging on the camera.

In a third aspect, another embodiment of the present disclosure further provides a backlight module, where the backlight module includes the under-screen camera assembly of any one of above solutions.

In a fourth aspect, yet another embodiment of the present disclosure further provides a display device, where the display device includes the backlight module.

Advantageous Effects: compared with the related art, the present disclosure provides an under-screen camera assembly, including: an Organic Light Emitting Diode (OLED) screen on which an OLED high transmittance region is disposed; a first polarizer and a second polarizer both disposed on the OLED high transmittance region, where the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect. The under-screen camera assembly of the present disclosure is provided with the TFT driving circuit for driving the liquid crystals to deflect, so that, when the TFT driving circuit is energized, the liquid crystals are deflected to enable light rays to pass through the polarizers to realize an effect of eliminating diffraction of the far-field light source, thereby avoiding distortion of an image obtained by photographing.

DESCRIPTION OF REFERENCE NUMERALS

Figure 1:
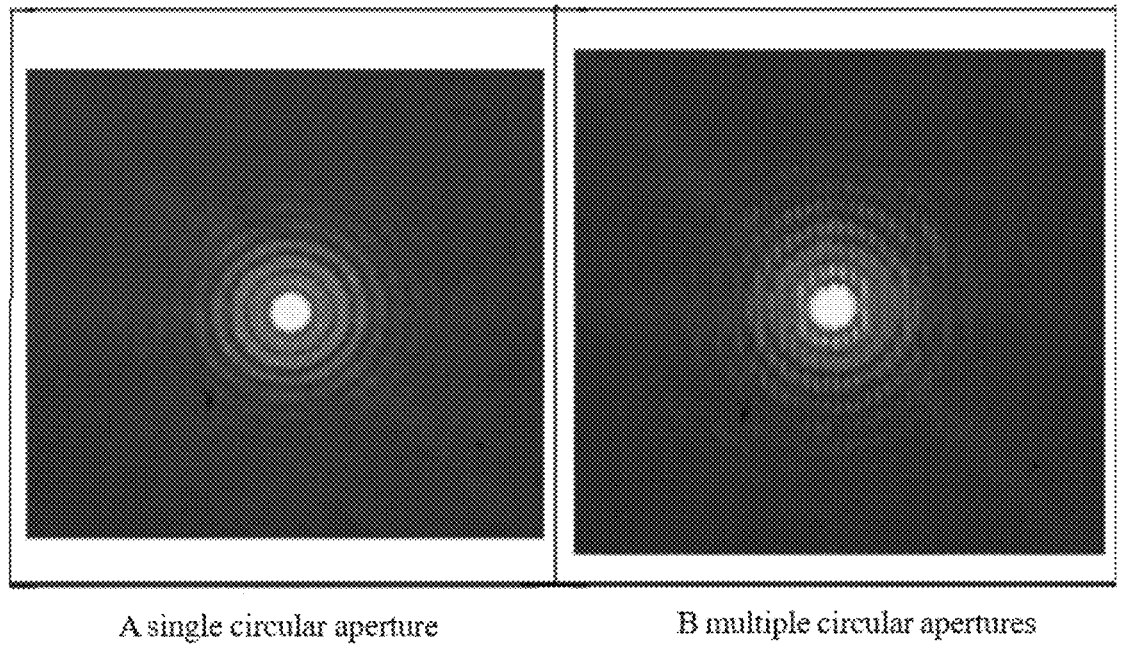
FIG. 1 is a single circular aperture diffraction pattern and a double circular aperture diffraction pattern in the related art.

| OLED screen | 10 | OLED high transmittance region | 20 |
|---|---|---|---|
| First polarizer | 310 | Second polarizer | 320 |
| Liquid crystal | 40 | TFT driving circuit | 50 |
| Camera body | 60 | Imaging sensor | 70 |
| Camera convex lens | 80 | | |

DETAILED DESCRIPTION

To make the objectives, technical solutions, and effects of the present disclosure more clear and definite, the present disclosure is illustrated in detail below by referring to the accompanying drawings and illustrating the embodiments. It should be understood that the specific embodiments described here are only used to explain the present disclosure, and are not used to limit the present disclosure.

Those skilled in the art can understand that, as used herein, the singular forms "a", "an", "said" and "the" may include the plural forms as well, unless expressly stated otherwise. It should be further understood that the word "comprise" when used in this specification of the present disclosure is taken to specify the presence of the features, integers, steps, operations, elements, and/or components, but does not preclude the presence or addition of one or more other features, integers, steps, operations, elements, components, and/or combination thereof. It should be understood that when an element is referred to as being "connected" or "coupled" to another element, it can be directly connected or coupled to the other element or an intervening element may also be present. Furthermore, "connected" or "coupled" as used herein may include wireless connection or wireless coupling. As used herein, the phrase "and/or" includes all or any element and all combinations of one or more of the associated listed items.

Those skilled in the art can understand that, unless otherwise defined, all terms (including technical and scientific terms) used herein have the same meanings as those commonly understood by those of ordinary skill in the art to which the disclosure belongs. It should also be understood that terms, such as those defined in commonly used dictionaries, should be interpreted as having a meaning that is consistent with the meaning of the context of the current technology and will not be interpreted in an idealized or overly formal sense unless defined as here.

With increasing development of display technologies and increasing public demand, a display with a high-screen ratio has become an irresistible trend, and a mobile device with a high-screen ratio has a narrower frame and a wider display area, and a smaller outline size under the same screen size than an existing mobile device. However, since there are some necessary elements in a front panel of the mobile device, such as, a camera, an infrared sensor, etc., the display screen in most of mobile devices need to be provided with certain space to avoid related elements at present. In most cases, a hole may be directly formed on the display screen and the camera may be placed under the screen. However, stacking of various layers of materials of the screen form refraction of the screen in the various layers and opacity of RGB (red, green, and blue) light-emitting points displayed on the screen, forming a hole area diffraction or a barrier diffraction. In particular, in the case where a light source is relatively strong or a portion of the light source is relatively large, a picture taken may be obscured by diffraction, so that more valid display areas are covered by the diffracted light source, and a specimen taken is seriously distorted.

Figure 2:
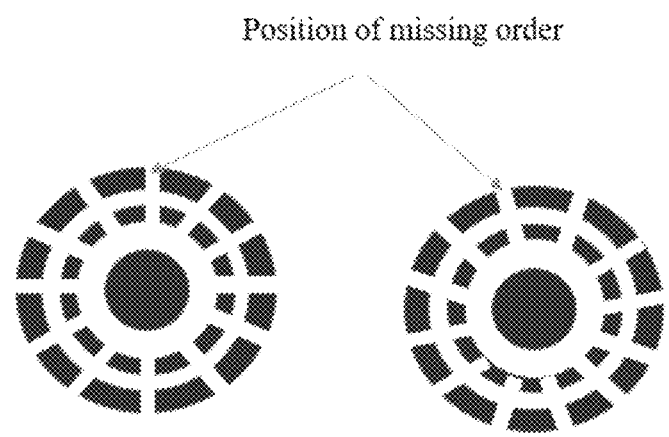
FIG. 2 is a schematic diagram of missing order upon multiple circular aperture diffraction in the related art.
Figure 4:
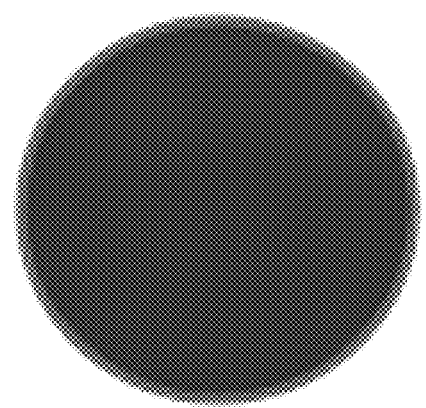
FIG. 4 is a schematic diagram of diffraction obtained with the under-screen camera assembly according to an embodiment of the present disclosure.

For example, according to the Babinet complementarity principle, diffraction patterns produced by holes or screens of the same shape are the same. The patterns are either circular, polygonal or slit. The diffraction refers to a physical phenomenon that a wave deviates from the original straight line to propagate when encountering an obstacle, and the diffraction phenomenon is more obvious when the obstacle is smaller than the wavelength of the wave. As shown in FIG. 1, A indicates a single circular aperture diffraction pattern, and B indicates a double circular aperture diffraction pattern. The single circular aperture diffraction is the diffraction of continuous circular rings, and the multiple circular apertures presented are circular apertures having a missing order phenomenon, where the missing order phenomenon refers to a phenomenon that the bright pattern of circumferences have dark portions and bright portions separated from each other except a central bright pattern, as shown in FIG. 2. Also, when diffraction of the multiple circular apertures occurs, if the position of each of the circular apertures is moved, the position and intensity of the central bright pattern are unchanged, but the position of the missing order is moved with the position of the position of circular aperture, or the position of bright light spot may be shifted, and the position of the position of the missing order may be shifted. With the principle, the present embodiment provides an under-screen camera assembly, where the under-screen camera assembly is provided with a TFT driving circuit for driving the liquid crystals to deflect. When a plurality of liquid crystals exist, diffraction patterns generated by deflected liquid crystals are different from each other. Therefore, fusion of the diffraction patterns generated by the plurality of liquid crystals may supplement of the position of missing order, thereby realizing the effect of eliminating the diffraction of the far-field light source, as shown in FIG. 4.

Figure 3:
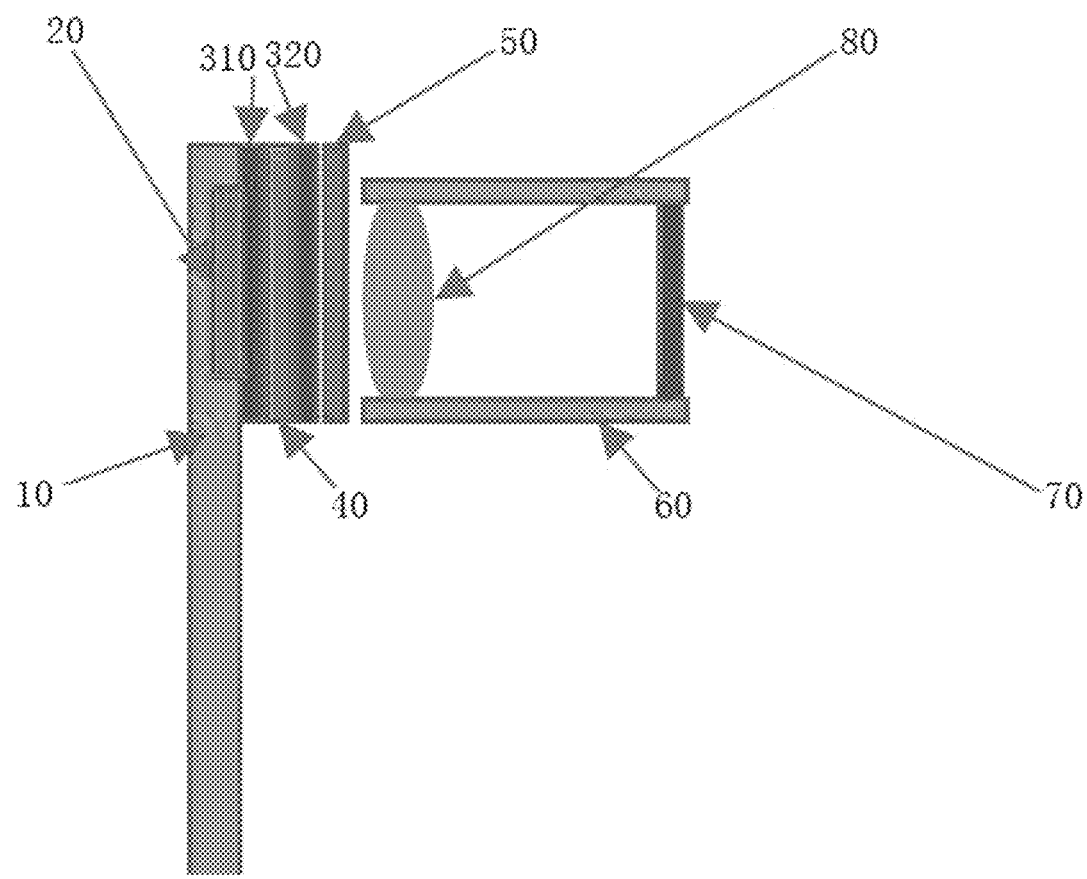
FIG. 3 is a schematic structural diagram of an under-screen camera assembly according to an embodiment of the present disclosure.

Specifically, as shown in FIG. 3, the under-screen camera assembly of the present embodiment includes an OLED screen 10, a first polarizer 310, a second polarizer 320, liquid crystals 40, a TFT driving circuit 50, and a camera. The OLED screen 10 may be provided with an OLED high transmittance region 20 for allowing light rays to pass through the OLED screen 10 and enter the inside of the under-screen camera assembly to perform imaging on the camera. In a specific implementation of the under-screen camera assembly, the OLED high transmittance region 20 in the present embodiment has a high light transmittance and is disposed on one side of the OLED screen. Specifically, when the OLED high transmittance region 20 is disposed on a mobile terminal (such as a mobile phone), that is, under the OLED screen 10 at the top of the mobile phone. When the mobile phone is used for photographing, light rays emitted by a far-field light source can enter the inside of the under-screen camera assembly through the OLED high transmittance region 20 under the OLED screen 10, so as to perform imaging on the camera.

In the present embodiment, the OLED high transmittance region 20 is provided with a first polarizer 310 and a second polarizer 320. The first polarizer 310 and the second polarizer 320 are stacked, that is, the first polarizer 310 is stacked on the OLED high transmittance region 20 and the second polarizer 320 is stacked on the first polarizer 310. In a specific application of the under-screen camera assembly, the first polarizer 310 and the second polarizer 320 in the present embodiment have the same area, that is, have the same shape and the same size, and the first polarizer 310 and the second polarizer 320 cover the OLED high transmittance region 20 on the OLED screen 10, that is, the area of the OLED high transmittance region 20 is less than the area of the first polarizer 310, so that all light rays transmitted through the OLED high transmittance region 20 can be received. In the present embodiment, liquid crystals 40 are disposed between the first polarizer 310 and the second polarizer 320 and configured to perform imaging, and a line for driving RGB light-emitting points to light on the liquid crystals 40 is a transparent ITO material. In the present embodiment, the liquid crystals 40 are provided with a plurality of liquid crystals, and all of the liquid crystals 40 are disposed between the first polarizer 310 and the second polarizer 320. Each of the plurality of liquid crystals 40 provided in the present embodiment is connected to a TFT driving circuit 50, and the TFT driving circuit 50 is configured to drive the liquid crystals 40 to deflect. In the present embodiment, it is possible to control deflection angles of the liquid crystals 40 to be different from each other. As such, selected regions of the liquid crystals 40 are different, so that a central light spot is unchanged, and missing order occurs in different regions of a circular light spot. A plurality of samples are collected with deflection of different liquid crystals 40, and the obtained samples are fused through an image fusion algorithm. As such, it is possible to supplement missing order positions, thereby eliminating the diffraction of the far-field light source and realizing an effect of the light spot as shown in FIG. 4.

In one implementation, the first polarizer 310, the second polarizer 320, and the liquid crystals 40 have the same area in the present embodiment. Further, the TFT driving circuit 50 in the present embodiment is disposed on the second polarizer 320, and is connected to the plurality of liquid crystals 40 provided in the present embodiment. Therefore, the plurality of liquid crystals 40 can be separately subjected to deflection control so as to control deflection angles of the liquid crystals 40 to be different from each other. In addition, the under-screen camera assembly in the present embodiment further includes a camera disposed on one side of the TFT driving circuit 50 and opposite to the liquid crystals 40. The camera includes: a camera body 60; a camera convex lens 80 disposed inside the camera body 60; and an imaging sensor 70 disposed outside the camera body 60; where the camera convex lens 80 is disposed opposite to the liquid crystals 40. As such, the camera convex lens 80 can conveniently receive light rays from the far-field light source.

Based on the above-described embodiments, the present disclosure further provides a backlight module, where the backlight module includes the under-screen camera assembly of any one of the above-described embodiments. Specifically, the under-screen camera assembly includes: an OLED screen 10, a first polarizer 310, a second polarizer 320, liquid crystals 40, a TFT driving circuit 50, and a camera. The OLED screen 10 may be provided with an OLED high transmittance region 20 for allowing light rays to pass through the OLED screen 10 and enter the inside of the under-screen camera assembly to perform imaging on the camera. In a specific implementation of the under-screen camera assembly, the OLED high transmittance region 20 in the present embodiment has a high light transmittance and is disposed on one side of the OLED screen. Specifically, when the OLED high transmittance region 20 is disposed on a mobile terminal (such as a mobile phone), that is, under the OLED screen 10 at the top of the mobile phone. When the mobile phone is used for photographing, light rays emitted by a far-field light source can enter the inside of the under-screen camera assembly through the OLED high transmittance region 20 under the OLED screen 10, so as to perform imaging on the camera.

In the present embodiment, the OLED high transmittance region 20 is provided with a first polarizer 310 and a second polarizer 320. The first polarizer 310 and the second polarizer 320 are stacked, that is, the first polarizer 310 is stacked on the OLED high transmittance region 20 and the second polarizer 320 is stacked on the first polarizer 310. In a specific application of the under-screen camera assembly, the first polarizer 310 and the second polarizer 320 in the present embodiment have the same area, that is, have the same shape and the same size, and the first polarizer 310 and the second polarizer 320 cover the OLED high transmittance region 20 on the OLED screen 10, that is, the area of the OLED high transmittance region 20 is less than the area of the first polarizer 310, so that all light rays transmitted through the OLED high transmittance region 20 can be received. In the present embodiment, liquid crystals 40 are disposed between the first polarizer 310 and the second polarizer 320 and configured to perform imaging, and a line for driving RGB light-emitting points to light on the liquid crystals 40 is a transparent ITO material. In the present embodiment, the liquid crystals 40 are provided with a plurality of liquid crystals, and all of the liquid crystals 40 are disposed between the first polarizer 310 and the second polarizer 320. Each of the plurality of liquid crystals 40 provided in the present embodiment is connected to a TFT driving circuit 50, and the TFT driving circuit 50 is configured to drive the liquid crystals 40 to deflect. In the present embodiment, it is possible to control deflection angles of the liquid crystals 40 to be different from each other. As such, selected regions of the liquid crystals 40 are different, so that a central light spot is unchanged, and missing order occurs in different regions of a circular light spot. A plurality of samples are collected with deflection of different liquid crystals 40, and the obtained samples are fused through an image fusion algorithm. As such, it is possible to supplement missing order positions, thereby eliminating the diffraction of the far-field light source and realizing an effect of the light spot as shown in FIG. 4.

Based on the above-described embodiments, the present disclosure further provides a display device, where the display device includes the backlight module of any one of the above-described embodiments. The backlight module of the present embodiment includes the under-screen camera assembly, where the under-screen camera assembly is provided with the TFT driving circuit 50 for driving the liquid crystals 40 to deflect. As such, when the TFT driving circuit 50 is energized, the liquid crystals 40 are deflected to enable light rays to pass through the polarizers to realize an effect of eliminating diffraction of the far-field light source, thereby avoiding distortion of an image obtained by photographing.

In summary, the present disclosure discloses an under-screen camera assembly, a backlight module, and a display device. The under-screen camera assembly includes: an Organic Light Emitting Diode (OLED) screen on which an OLED high transmittance region is disposed; a first polarizer and a second polarizer both disposed on the OLED high transmittance region, where the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect. The under-screen camera assembly of the present disclosure is provided with the TFT driving circuit for driving the liquid crystals to deflect, so that, when the TFT driving circuit is energized, the liquid crystals are deflected to enable light rays to pass through the polarizers to realize an effect of eliminating diffraction of the far-field light source.

Finally, it should be noted that the aforesaid embodiments are only intended to explain but not to limit the technical solutions of the present disclosure. Although the present disclosure has been explained in detail with reference to the above-described embodiments, the person of ordinary skill in the art may understand that, the technical solutions described in each of the embodiments mentioned above may still be amended, or some technical features in the technical solutions may be replaced equivalently; these amendments or equivalent replacements, which doesn't cause the essence of the corresponding technical solution to be broken away from the spirit and the scope of the technical solution in various embodiments of the present disclosure, should all be included in the protection scope of the present disclosure.

What is claimed is:

1. An under-screen camera assembly, comprising: an Organic Light Emitting Diode (OLED) screen, wherein the OLED screen is provided with an OLED high transmittance region; a first polarizer and a second polarizer both disposed on the OLED high transmittance region, wherein the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect; and wherein a plurality of liquid crystals are provided, and each of the liquid crystals is connected to the TFT driving circuit and has a different deflection angle from that of another one of the liquid crystals.

2. The under-screen camera assembly of claim 1, wherein the under-screen camera assembly further comprises: a camera disposed on one side of the TFT driving circuit and opposite to the liquid crystals.

3. The under-screen camera assembly of claim 1, wherein the camera comprises: a camera body; a camera convex lens disposed inside the camera body; and an imaging sensor disposed outside the camera body; and wherein the camera convex lens is disposed opposite to the liquid crystals.

4. The under-screen camera assembly of claim 1, wherein, a line on the liquid crystals for driving RGB light-emitting points to light is a transparent Indium Tin Oxide (ITO) material.

5. The under-screen camera assembly of claim 1, wherein an area of the OLED high transmittance region is less than that of the first polarizer.

6. The under-screen camera assembly of claim 5, wherein the first polarizer, the second polarizer, and the liquid crystals have the same area.

7. The under-screen camera assembly of claim 6, wherein the first polarizer and the second polarizer have the same shape.

8. The under-screen camera assembly of claim 1, wherein the OLED high transmittance region is disposed under the OLED screen, and when a mobile phone is configured to photograph, light rays emitted by a far-field light source enter an inside of the under-screen camera assembly through the OLED high transmittance region to perform imaging on the camera.

9. A backlight module, comprising: an under-screen camera assembly, comprising:

an Organic Light Emitting Diode (OLED) screen, wherein the OLED screen is provided with an OLED high transmittance region; a first polarizer and a second polarizer both disposed on the OLED high transmittance region, wherein the second polarizer is stacked on the first polarizer; liquid crystals disposed between the first polarizer and the second polarizer; and a Thin Film Transistor (TFT) driving circuit disposed on the second polarizer and configured for driving the liquid crystals to deflect, and wherein a plurality of liquid crystals are provided, and each of the liquid crystals is connected to the TFT driving circuit and has a different deflection angle from that of another one of the liquid crystals.

10. A display device, comprising: the backlight module of claim 9.

* * * * *